(12) United States Patent
Hietala

(10) Patent No.: US 7,313,376 B1
(45) Date of Patent: Dec. 25, 2007

(54) DC OFFSET CORRECTION FOR A WIRELESS COMMUNICATION SYSTEM

(75) Inventor: Alexander Wayne Hietala, Phoenix, AZ (US)

(73) Assignee: RF Micro Devices, Inc., Greensboro, NC (US)

( * ) Notice: Subject to any disclaimer, the term of this patent is extended or adjusted under 35 U.S.C. 154(b) by 411 days.

(21) Appl. No.: 10/987,883

(22) Filed: Nov. 12, 2004

(51) Int. Cl.
*H04B 1/06* (2006.01)

(52) U.S. Cl. .............................. 455/232.1; 455/240.1; 375/345

(58) Field of Classification Search ................ 455/295, 455/296, 310, 312, 303, 307, 324, 340, 232.1, 455/234.1, 234.2, 239.1, 240.1, 250.1, 251.1, 455/255, 256, 313; 375/345
See application file for complete search history.

(56) References Cited

U.S. PATENT DOCUMENTS

| | | | |
|---|---|---|---|
| 5,422,889 A | * | 6/1995 | Sevenhans et al. ......... 370/442 |
| 5,459,679 A | | 10/1995 | Ziperovich ................. 364/602 |
| 6,009,126 A | * | 12/1999 | Van Bezooijen ............ 375/319 |
| 6,560,448 B1 | * | 5/2003 | Baldwin et al. ......... 455/234.1 |
| 6,871,055 B2 | * | 3/2005 | Hirano et al. ............... 455/310 |
| 7,076,225 B2 | * | 7/2006 | Li et al. .................. 455/245.1 |
| 2002/0197975 A1 | * | 12/2002 | Chen ......................... 455/324 |
| 2003/0133518 A1 | | 7/2003 | Koomullil et al. .......... 375/326 |

* cited by examiner

*Primary Examiner*—Edward F. Urban
*Assistant Examiner*—Nhan T. Le
(74) *Attorney, Agent, or Firm*—Withrow & Terranova, PLLC

(57) ABSTRACT

A system and method for performing DC offset correction in a wireless communication receiver during "dead time" are provided. The receiver includes amplifier circuitry that amplifies a received radio frequency (RF) signal, downconversion circuitry that downconverts the received RF signal to provide a downconverted signal, digitization circuitry that digitizes the downconverted signal to provide a digital signal, and digital DC offset correction circuitry enabled during the dead time when there should be no DC content in the downconverted signal. In operation, the digital DC offset correction circuitry detects a DC offset of the digital signal and subtracts the DC offset from the digital signal.

Figure 1:
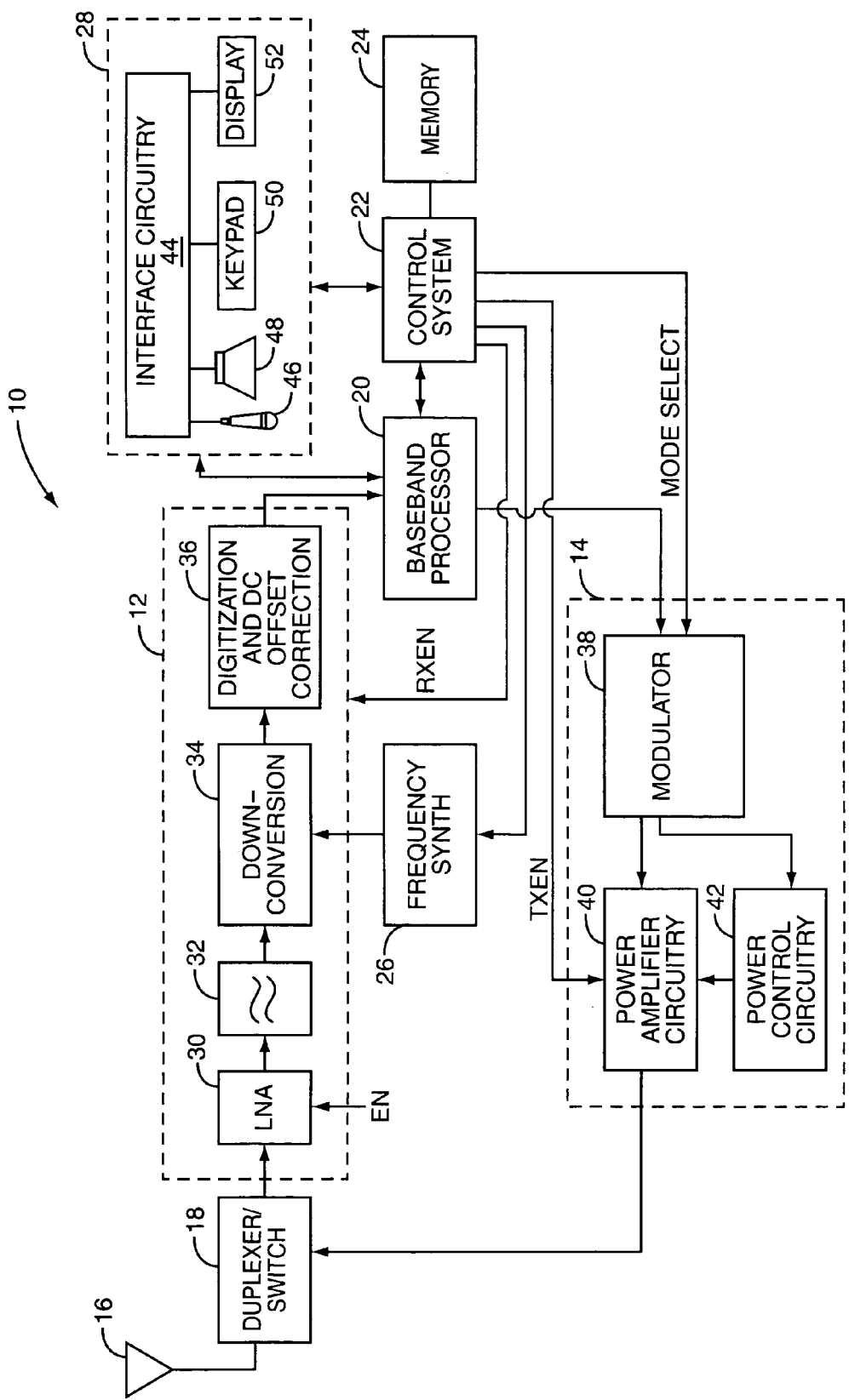

19 Claims, 3 Drawing Sheets

DC OFFSET CORRECTION FOR A WIRELESS COMMUNICATION SYSTEM

FIELD OF THE INVENTION

The present invention relates to DC offset correction for a wireless communication system, and more particularly relates to DC offset correction for a wireless communication system performed during "dead time" having no DC content.

BACKGROUND OF THE INVENTION

A common problem in wireless communication receivers is DC offset. This is especially a concern in Direct Conversion Receivers (DCRs) where received radio frequency (RF) signals are converted directly to baseband using a local oscillator (LO) signal having a frequency equal to the frequency of the received RF signals. When downconverting the RF signals, the LO signal leaks to the inputs of mixers used to downconvert the RF signals, thereby creating a DC offset error associated with downconversion. To correct this DC offset, DC offset correction is typically performed while a low noise amplifier (LNA) that amplifies the received RF signals prior to downconversion is disabled. The LNA must be disabled because typical DC offset correction circuits are peak hold circuits, where a peak hold circuit tracks and cancels its input signal. Thus, the LNA must be disabled in order to prevent corruption of the DC offset correction by received signals. However, when the LNA is enabled after DC offset correction, a residual DC offset occurs due to LO leakage into the input of the LNA. Accordingly, there remains a need for a DC offset correction system that corrects DC offset errors caused by the LO leakage into the input of the LNA as well as LO leakage into the input of the downconversion circuitry and other DC offsets in a receiver for a wireless communication system.

SUMMARY OF THE INVENTION

The present invention provides a system and method for performing DC offset correction in a wireless communication receiver during "dead time." The receiver includes amplifier circuitry that amplifies a received radio frequency (RF) signal, downconversion circuitry that downconverts the received RF signal to provide a downconverted signal, digitization circuitry that digitizes the downconverted signal to provide a digital signal, and digital DC offset correction circuitry enabled during the dead time when there should be no DC content in the downconverted signal. Thus, as used herein, dead time is the time during which there should be no DC content in the downconverted signal. In operation, the digital DC offset correction circuitry detects a DC offset of the digital signal and subtracts the DC offset from the digital signal.

More specifically, the digital DC offset correction circuitry includes a digital low-pass filter that operates to time average the DC offset of the digital signal when enabled. Timing circuitry operates to enable the digital low pass filter during the dead time and disable the digital low-pass filter at the end of the dead time. Once disabled, the digital low-pass filter provides the DC offset to subtraction circuitry, which subtracts the DC offset from the digital signal.

In one embodiment, the receiver operates according to the Global System for Mobile Communication (GSM) standard, and the dead time is a guard time during which the received RF signal contains only guard bits. The guard bits result in the downconverted signal being a fixed tone at some frequency offset from DC. The digital low-pass filter removes the fixed tone from the digital signal such that the DC offset correction is not corrupted by the fixed tone.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

Figure 2:
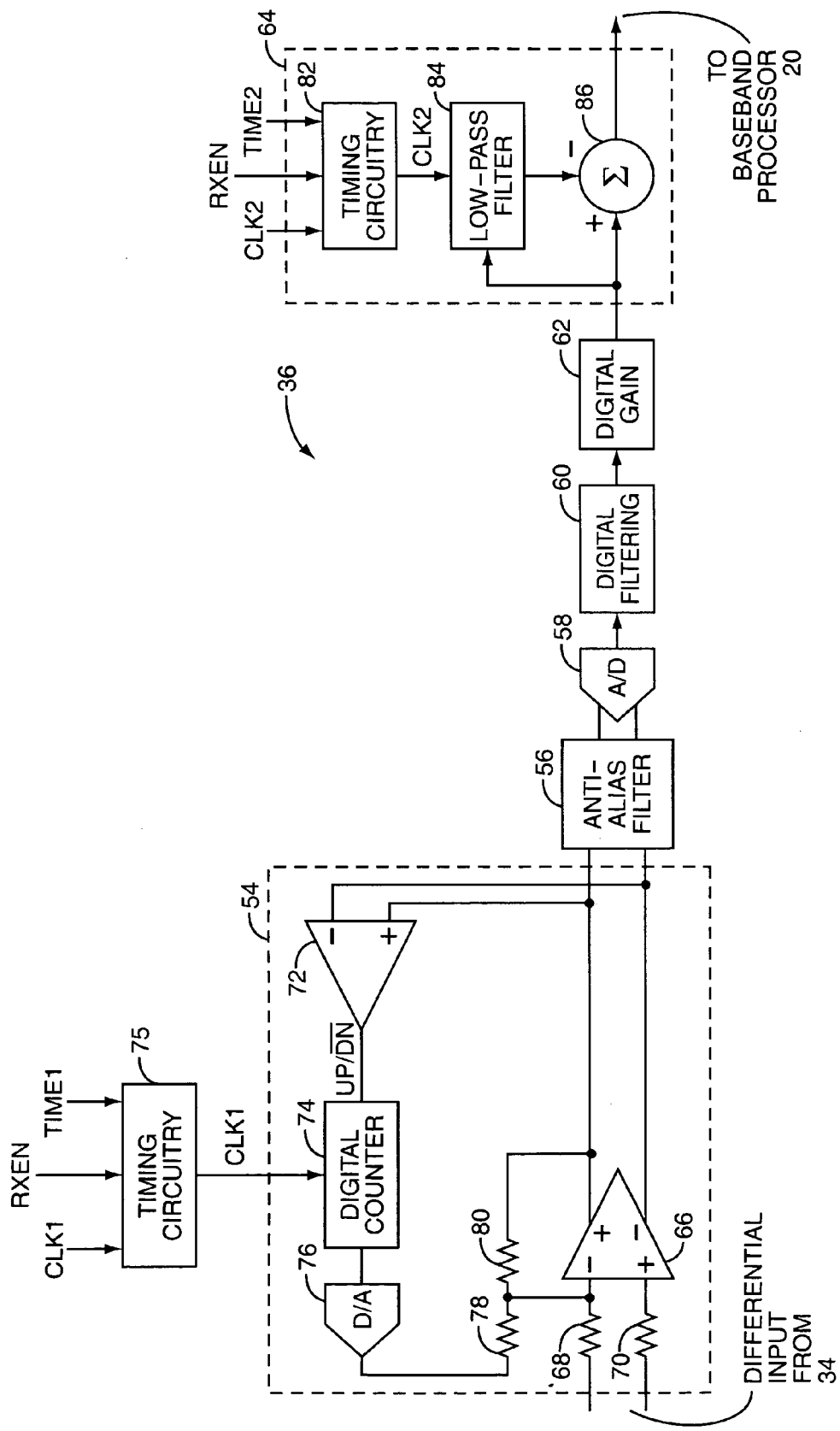
Figure 3:
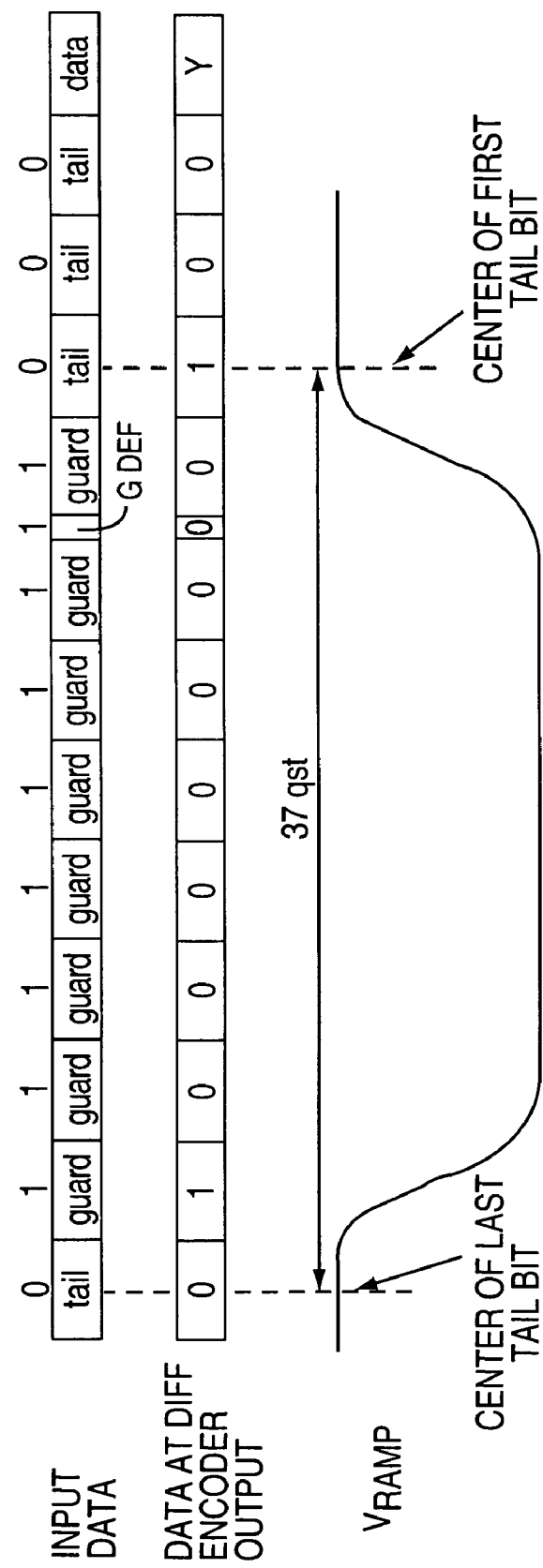

FIG. 1 illustrates an exemplary embodiment of a mobile terminal including DC offset correction circuitry of the present invention;

FIG. 2 illustrates an exemplary embodiment of the DC offset correction circuitry of the present invention; and FIG. 3 illustrates the guard time between two adjacent transmit bursts in either a General Packet Radio Service (GPRS) or Enhanced General Packet Radio Service (EG-PRS) system as an example of "dead time" during which the DC offset correction circuitry of the present invention performs DC offset correction.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

While the present invention is particularly well-suited for use in a mobile terminal, and particularly a mobile terminal that operates according to the Global System for Mobile Communications (GSM) standard, it should be appreciated that the present invention may be used any wireless receiver operating according to a standard such as, but not limited to, the GSM standard, the Time Division Multiple Access (TDMA) standard, or the Code Division Multiple Access (CDMA) standard, wherein the standard defines a "dead time" during which received signals that downconverted to baseband should have no DC content.

The present invention is preferably incorporated in a mobile terminal 10, such as a mobile telephone, personal digital assistant, or the like. The basic architecture of a mobile terminal 10 is represented in FIG. 1, and may include a receiver front end 12, a radio frequency transmitter section 14, an antenna 16, a duplexer or switch 18, a baseband processor 20, a control system 22, memory 24, a frequency synthesizer 26, and an interface 28. The receiver front end 12 receives information bearing radio frequency signals from one or more remote transmitters provided by a base station (not shown). A low noise amplifier (LNA) 30 amplifies the signal. As discussed below in more detail, the LNA 30 receives an enable signal (EN) such that the LNA 30 is disabled during coarse DC offset correction and enabled during fine DC offset correction and reception of the radio frequency signals. The enable signal (EN) may be provided by the control system 22. Alternatively, the enable signal (EN) may be provided by the receiver front end 12 based on a receiver enable signal (RXEN) from the control system 22.

A filter circuit 32 minimizes broadband interference in the received signal, while a downconversion circuitry 34 downconverts the filtered, received signal to a very low intermediate frequency (VLIF) or baseband frequency signal. The downconverted signal is then digitized and DC offset correction is performed by digitization and DC offset correction circuitry 36. The receiver front end 12 typically uses one or more mixing frequencies generated by the frequency synthesizer 26.

The baseband processor 20 processes the digitized, received signal to extract the information or data bits conveyed in the received signal. This processing typically comprises demodulation, decoding, and error correction operations. As such, the baseband processor 20 is generally implemented in one or more digital signal processors (DSPs).

On the transmit side, the baseband processor 20 receives digitized data from the control system 22, which it encodes for transmission. The control system 22 may run software stored in the memory 24. Alternatively, the operation of the control system 22 may be a function of sequential logic structures as is well understood. After encoding the data from the control system 22, the baseband processor 20 outputs the encoded data to the radio frequency transmitter section 14. A modulator 38 receives the data from the baseband processor 20 and operates to provide a modulated signal to the power amplifier circuitry 40. In this embodiment, the modulator 38 operates according to one of two modulation schemes, and the modulation scheme of the modulator 38 is controlled by a mode select signal (MODE SELECT) from the control system 22. In an exemplary embodiment, the mobile terminal 10 operates according to the GSM standard, and the modulator 38 operates according to either an 8-Level Phase Shift Keying (8PSK) modulation scheme, which is a modulation scheme containing both amplitude and phase components, or a Gaussian Minimum Shift Keying (GMSK) modulation scheme, which is a constant amplitude modulation scheme. When in 8PSK mode, the modulator 38 provides a phase component of a polar transmit signal at a desired transmit frequency to the power amplifier circuitry 40 and an amplitude component of the polar transmit signal to the power control circuitry 42. The power control circuitry 42 controls an output power of the power amplifier circuitry 40 based on the amplitude component or optionally a combination of a ramping signal and the amplitude component, thereby providing amplitude modulation of the phase component. When in GMSK mode, the modulator 38 provides a phase modulated signal to the power amplifier circuitry 40 and the ramping signal to the power control circuitry 42, where the power control circuitry 42 controls the output power of the power amplifier circuitry 40 based on the ramping signal. It should be noted that the mobile terminal 10, and thus the modulator 38, of the present invention is not limited to the GSM standard nor the GMSK and/or 8PSK modulation schemes.

The power amplifier circuitry 40 amplifies the modulated signal from the modulator 38 to a level appropriate for transmission from the antenna 16. A gain of the power amplifier circuitry 40 is controlled by the power control circuitry 42. In essence, the power control circuitry 42 operates to control a supply voltage provided to the power amplifier circuitry 40 based on the amplitude component or, optionally, a combination of the amplitude component and the ramping signal from the modulator 38 when in the 8PSK mode and based on the ramping signal when in GMSK mode.

A user may interact with the mobile terminal 10 via the interface 28, which may include interface circuitry 42 associated with a microphone 46, a speaker 48, a keypad 50, and a display 52. The interface circuitry 44 typically includes analog-to-digital converters, digital-to-analog converters, amplifiers, and the like. Additionally, it may include a voice encoder/decoder, in which case it may communicate directly with the baseband processor 20.

The microphone 46 will typically convert audio input, such as the user's voice, into an electrical signal, which is then digitized and passed directly or indirectly to the baseband processor 20. Audio information encoded in the received signal is recovered by the baseband processor 20, and converted into an analog signal suitable for driving speaker 48 by the interface circuitry 44. The keypad 50 and display 52 enable the user to interact with the mobile terminal 10, input numbers to be dialed and address book information, or the like, as well as monitor call progress information.

While the present invention is well-suited for incorporation into a mobile terminal, such as the mobile terminal 10 just described, it should be noted that the present invention is well-suited for use in any wireless transmitter such as, but not limited to, a transmitter including the radio frequency transmitter section 14, a wireless transmitter associated with a wireless Local Area Network (LAN), and the like. As such, the present invention is not limited to a particular apparatus.

FIG. 2 illustrates the digitization and DC offset correction circuitry 36 according to one embodiment of the present invention. In general, the digitization and DC offset correction circuitry 36 includes analog DC offset correction circuitry 54, an anti-alias filter 56, analog-to-digital (A/D) conversion circuitry 58, digital filtering circuitry 60, digital gain circuitry 62, and digital DC offset correction circuitry 64. It should be noted that the analog DC offset correction circuitry 54 is optional and is not necessary for the present invention.

In this embodiment, the analog DC offset correction circuitry 54 is essentially a peak hold system that tracks an output signal of the analog DC offset correction circuitry 54 and offsets an input signal of the analog DC offset correction circuitry 54 such that that the output signal is forced to zero. Because the analog DC offset correction circuitry 54 cancels out any signal seen at its input when it is enabled and performing DC offset correction, the analog DC offset correction circuitry 54 only performs DC offset correction when the LNA 30 (FIG. 1) is disabled such that no signals other than a DC offset caused by circuitry between the LNA 30 and the analog DC offset correction circuitry 54 are seen at the input of the analog DC offset correction circuitry 54.

More specifically, the analog DC offset correction circuitry 54 includes a differential amplifier 66 that receives a differential input signal from the downconversion circuitry 34 (FIG. 1) via resistors 68, 70. A differential output signal of the differential amplifier 66 is provided to the anti-alias filter 56 as the output of the analog DC offset correction circuitry 54. The differential output signal is also provided to a comparator 72 which compares a positive component of the differential output signal to a negative component of the differential output signal. It should be noted that the positive and negative components of the differential output signal are equal only when the differential output signal is zero. Based on the comparison, the comparator 72 provides a control signal (UP/DN) to a digital counter 74. The digital counter 74 receives a clock signal (CLK1) such that an output signal is incremented by one for each pulse of the clock signal (CLK1) when the control signal is "high" and decremented by one when the control signal is "low."

The clock signal (CLK1) is provided by timing circuitry 75 which may or may not be part of the analog DC offset correction circuitry 54. The timing circuitry 75 receives the clock signal (CLK1), the receiver enable signal (RXEN), and a first timer value (TIME1). When the receiver front end 12 (FIG. 1) is enabled by the receiver enable signal (RXEN), the timing circuitry 75 provides the clock signal (CLK1) to the digital counter 74 for an amount of time corresponding to the first timer value (TIME1) after the receiver front end 12 is enabled. After the first timer value (TIME1) has expired, the timing circuitry 75 disables the clock signal (CLK1) provided to the digital counter 74, thereby disabling the digital counter 74. At that point, the analog DC offset correction (coarse DC offset correction) is complete, and the output of the digital counter 74 remains constant.

The output signal of the digital counter 74 is converted to an analog signal by digital-to-analog (D/A) conversion circuitry 76 and provided to a resistor network. In this embodiment, the resistor network includes resistors 78, 80 arranged as shown. Thus, feedback circuitry including the comparator 72, the digital counter 74, and the D/A conversion circuitry 76 operates to adjust the differential input signal based on the comparison of the positive and negative components of the differential output signal.

At some point during DC offset correction, the differential output signal is essentially zero such that the positive and negative components of the differential output signal are essentially equal. However, the comparator 72 has only two output states. Thus, when the differential output signal is essentially zero, the output of the comparator 72 causes the output of the digital counter 74 to "toggle" between two values, thereby creating a residual DC error. Accordingly, the analog DC offset correction circuitry 54 is referred to herein as providing "coarse" DC offset correction. The residual DC error is defined by the bit resolution of the D/A conversion circuitry 76 and the number of bits of the digital counter 74.

The differential output signal from the analog DC offset correction circuitry 54 is provided to the anti-alias filter 56. The anti-alias filter 56 is a low-pass filter with a cut-off frequency of approximately ½ a sampling frequency (Nyquist frequency) of the A/D conversion circuitry 58. As will be apparent to one of ordinary skill in the art, the anti-alias filter 56 prevents frequencies above half the sampling frequency of the A/D conversion circuitry 58 from passing into the A/D conversion circuitry 58, thereby preventing aliasing at the output of the A/D conversion circuitry 58.

After being filtered by the anti-alias filter 56, the signal is digitized by the A/D conversion circuitry 58, and a digital signal is provided to the digital filtering circuitry 60. The digital filtering circuitry 60 operates to shape the digital signal and remove unwanted frequency components to provide a filtered digital signal to the digital gain circuitry 62. The digital gain circuitry 62 digitally amplifies the filtered digital signal. When the digital DC offset correction circuitry 64 is performing DC offset correction, the gain of the digital gain circuitry 62 amplifies the DC offset such that improved DC offset correction is achieved.

In the illustrated embodiment, the digital DC offset correction circuitry 64 includes timing circuitry 82, a digital low-pass filter 84, and subtraction circuitry 86, which may also be referred to herein as a "combiner." The timing circuitry 82 may alternatively be part of the timing circuitry 75. In operation, the timing circuitry 82 receives a clock signal (CLK2), the receiver enable signal (RXEN), and a second timer value (TIME2). When the receiver front end 12 (FIG. 1) is enabled by the receiver enable signal (RXEN), the timing circuitry 82 provides the clock signal (CLK2) to the digital low-pass filter 84 for an amount of time corresponding to the second timer value (TIME2) after the receiver front end 12 is enabled. It should be noted that the LNA 30 (FIG. 1) is enabled for at least a last portion of the amount of time defined by the second timer value (TIME2).

In one embodiment, the digital low-pass filter 84 is an Infinite Impulse Response (IIR) digital filter. When the timing circuitry 82 provides the clock signal (CLK2) to the digital low-pass filter 84, the digital DC offset correction circuitry 64 is enabled, and the digital low-pass filter 84 operates to remove essentially all frequency components other than the DC offset from the digital signal provided by the digital gain circuitry 62. In one embodiment, the digital low-pass filter 84 operates to time average the DC offset until the digital DC offset correction circuitry 64 is disabled by disabling the clock signal (CLK2) provided to the digital low-pass filter 84. Once disabled, the digital low-pass filter 84 provides a constant output corresponding to a time-averaged value of the DC offset to the subtraction circuitry 86. The subtraction circuitry 86 operates to subtract the time-averaged value of the DC offset from the digital signal output from the digital gain circuitry 62 to provide a digital output signal to the baseband processor 20.

As discussed above, the analog DC offset correction circuitry 54 can only operate when the LNA 30 (FIG. 1) is disabled. Otherwise, the analog DC offset correction circuitry 54 would also cancel out any signals present at its inputs. It is unable to distinguish between the DC offset and received signals. Conversely, by using the digital low-pass filter 84, the digital DC offset correction circuitry 64 can selectively cancel only frequencies near DC. However, if the receiver front end 12 (FIG. 1) is a direct conversion receiver (DCR), the received signals are downconverted to baseband.

The present invention takes advantage of the fact that in wireless communication systems operating according to a standard such as, but not limited to the GSM standard, TDMA standard, or CDMA standard, there are "dead times" defined by the standard. As used herein, "dead times" refer to times defined by the standard during which the down-converted signal should contain no DC content. In other words, during the dead times, the signal at the output of the downconversion circuitry 34 should ideally have no DC content. Thus, the only DC content in the output of the downconversion circuitry 34 is the DC offset of the receiver front end 12. For example, in a GSM system, the European Telecommunications Standards Institute (ETSI) specifies a particular data pattern in the guard time between data bursts. As shown in FIG. 3, when Gaussian Minimum Shift Keying (GMSK) modulation is used for General Packet Radio Service (GPRS) operation in the GSM system, guard bits transmitted during the guard time (8.25 symbol times between transmit bursts) are as if an input data pattern of all 1s had been fed into a differential encoder of the modulator of the transmitter. This results in a pattern of all 0s at the output of the differential encoder, where the pattern of all 0s is modulated and transmitted to the receiver front end 12 (FIG. 1). Such a pattern results in a fixed tone at approximately 67.708 kHz at the output of the downconversion circuitry 34 (FIG. 1). Similarly, when an 8-Level Phase Shift Keying (8PSK) modulation technique is used for Enhanced General Packet Radio Service (EGPRS) operation in the GSM system, the guard bits transmitted during the guard time are all 1s, and the pattern of all is modulated and transmitted to the receiver front end 12 (FIG. 1). Such a pattern results in a fixed tone at approximately 50.781 kHz at the output of the downconversion circuitry 34 (FIG. 1).

Thus, according to the present invention, the digital DC offset correction circuitry 64 may be enabled to operate during the guard time before or between GPRS or EGPRS timeslots while the LNA 30 (FIG. 1) is enabled. By doing so, the digital low-pass filter 84 removes the fixed tone at either 67.708 kHz or 50.781 kHz, and the total DC offset of the receiver front end 12 (FIG. 1) is corrected rather than only the DC offset caused by circuitry between the LNA 30 and the digitization and DC offset correction circuitry 36.

Again, it should be noted that the present invention is not limited to a GSM system. The DC offset correction system may be implemented in any wireless communication system operating according to a standard defining dead times where there is a need or desire to perform DC offset correction.

Thus, according to the present invention, the analog DC offset correction circuitry 54 is enabled only when the LNA 30 (FIG. 1) is disabled, which is times at which the receiver front end 12 (FIG. 1) does not receive radio frequency signals. The digital DC offset correction circuitry 64 is enabled during dead times when the LNA 30 is enabled and the downconverted signal output from the downconversion circuitry 34 (FIG. 1) ideally has no DC content. In addition, the digital DC offset correction circuitry 64 may be enabled along with the analog DC offset correction circuitry 54 when the LNA 30 is disabled. It should also be noted that, in one embodiment, the receiver front end 12 is a Very Low Intermediate Frequency (VLIF) receiver wherein the received radio frequency signals are downconverted to a VLIF frequency rather than to baseband. In this embodiment, the digital DC offset correction circuitry 64 may be enabled at any time because the digital low-pass filter 84 will remove the received signals at the VLIF frequency. However, the output of the digital low-pass filter 84 should not change while receiving a transmit burst in order to prevent distortion of the received signal. Thus, even if the receiver front end 12 is a VLIF receiver, it may be desirable to enable the digital DC offset correction circuitry 64 when the LNA 30 is disabled and/or during dead times when the LNA 30 is enabled.

In one embodiment, the analog DC offset correction circuitry 54 and the digital DC offset correction circuitry 64 perform DC offset correction after the receiver front end 12 (FIG. 1) is enabled by the receiver enable signal (RXEN) and before receiving the first transmitted burst. More specifically, the LNA 30 (FIG. 1) is disabled either prior to or upon receiving the receiver enable signal (RXEN) enabling the receiver front end 12. The first timer value (TIME1) is predetermined such that the analog DC offset correction circuitry 54 is enabled only while the LNA 30 is disabled. When the amount of time corresponding to the first timer value (TIME1) has expired, the analog DC offset correction circuitry 54 is disabled. At approximately the same time or shortly thereafter, the LNA 30 is enabled. The digital DC offset correction circuitry 64 is also enabled when the receiver front end 12 is enabled by the receiver enable signal (RXEN). The second timer value (TIME2) is predetermined such that the digital DC offset correction circuitry 64 is enabled while the LNA 30 is disabled and is further enabled after the LNA 30 is enabled until the beginning of reception of the first transmit burst.

At least a last portion of the time between the end of TIME1 and the end of TIME2 is known to be dead time, wherein the downconverted signal should have no DC content. It should be noted that all of the time between the end of TIME1 and the end of TIME2 may be dead time or only a last portion of the time between the end of TIME1 and the end of TIME2 may be dead time. However, if all of the time between the end of TIME1 and the end of TIME2 is not dead time, the dead time must occur during the last portion of the time between the end of TIME1 and the end of TIME2 in order to prevent corruption of the DC offset correction of the digital DC offset correction circuitry 64 by downconverted signals having DC content.

For a GSM system, the digital DC offset correction circuitry 64 is enabled until the beginning of the first tail bit of the first transmit burst, and at least the last portion of the time between the end of TIME1 and the end of TIME2 is the guard time, wherein the received radio frequency signal contains only guard bits. Alternatively, the digital DC offset correction circuitry 64 may not be enabled until the LNA 30 is enabled, in which case the DC offset correction circuitry 64 would remain enabled until the beginning of reception of the first transmit burst, as described above.

Unlike the analog DC offset correction circuitry 54, the digital DC offset correction circuitry 64 may also be enabled during dead time between reception of adjacent transmit bursts where there should be no DC content in downconverted signal at the output of the downconversion circuitry 34 (FIG. 1) during the dead time. As stated above, for a GSM system, the dead time is the guard time between adjacent transmit bursts.

Those skilled in the art will recognize improvements and modifications to the preferred embodiments of the present invention. All such improvements and modifications are considered within the scope of the concepts disclosed herein and the claims that follow.

What is claimed is:

1. A receiver for a wireless communication system comprising:
amplifier circuitry adapted to amplify a received radio frequency (RF) signal to provide an amplified RF signal;
downconversion circuitry adapted to convert the amplified RF signal to a downconverted signal;
digitization circuitry adapted to digitize the downconverted signal to provide a digital signal; and
digital DC offset correction circuitry adapted to receive the digital signal, detect a DC offset of the digital signal, and subtract the DC offset from the digital signal, wherein the digital DC offset correction circuitry is enabled during dead time when the downconverted signal should have no DC content and the amplifier circuitry is enabled.

2. The receiver of claim 1 wherein the digital DC offset correction circuitry comprises:
a digital low-pass filter adapted to filter the digital signal to detect the DC offset of the digital signal;
subtraction circuitry adapted to subtract the DC offset from the digital signal; and
timing circuitry adapted to enable the digital low-pass filter during dead time when the downconverted signal should have no DC content.

3. The receiver of claim 2 wherein the timing circuitry is further adapted to disable the digital low-pass filter at the end of the dead time, and the digital low-pass filter is further adapted to provide the DC offset of the digital signal as a constant value when disabled by the timing circuitry.

4. The receiver of claim 3 wherein the digital low-pass filter is further adapted to time average the DC offset of the digital signal and provide the DC offset to the subtraction circuitry upon being disabled by the timing circuitry.

5. The receiver of claim 2 wherein the receiver operates according to the Global System for Mobile Communications (GSM) standard.

6. The receiver of claim 5 wherein the dead time is at least a portion of a guard time defined by the GSM standard and corresponding to a period of time where the received RF signal contains guard bits, and the guard bits force a frequency of the downconverted signal to a fixed frequency offset from DC such that the fixed frequency is filtered from the digital signal by the digital low-pass filter.

7. The receiver of claim 6 wherein the timing circuitry is further adapted to disable the digital low-pass filter at a beginning of a first tail bit signifying an end of the guard time and a beginning of a received data burst.

8. The receiver of claim 6 wherein the guard time occurs between adjacent data bursts received by the receiver.

9. The receiver of claim 6 wherein the guard time occurs before a first data burst after the receiver is enabled.

10. The receiver of claim 1 wherein the receiver is a direct conversion receiver and the downconversion circuitry is further adapted to provide the downconverted signal at baseband.

11. A method of performing DC offset correction in a receiver for a wireless communication system comprising:
   amplifying a received radio frequency (RF) signal to provide an amplified RF signal;
   downconverting the amplified RF signal to a downconverted signal;
   digitizing the downconverted signal to provide a digital signal; and
   detecting a DC offset of the digital signal, and subtracting the DC offset from the digital signal during a dead time when the downconverted signal should have no DC content and the amplified RF signal is provided by amplifying the received RF signal.

12. The method of claim 11 further comprising subtracting the DC offset from the digital signal.

13. The method of claim 12 wherein detecting the DC offset of the digital signal comprises low-pass filtering the digital signal to detect the DC offset of the digital signal.

14. The method of claim 13 further comprising disabling the low-pass filtering of the digital signal at the end of the dead time and providing the DC offset of the digital signal as a constant value when the low-pass filtering of the digital signal is disabled.

15. The method of claim 14 wherein the low-pass filtering of the digital signal comprises time averaging the DC offset of the digital signal.

16. The method of claim 15 wherein the receiver operates according to the Global System for Mobile Communications (GSM) standard, and detecting the DC offset of the digital signal during the dead time comprises detecting the DC offset of the digital signal during at least a portion of a guard time defined by the GSM standard and corresponding to a period of time where the received RF signal contains guard bits, wherein the guard bits force a frequency of the downconverted signal to a fixed frequency offset from DC such that low-pass filtering the digital signal removes the fixed frequency.

17. The method of claim 15 further comprising disabling the low-pass filtering of the digital signal at a beginning of a first tail bit signifying an end of the guard time and a beginning of a received data burst.

18. The method of claim 15 wherein the guard time occurs between adjacent data bursts received by the receiver.

19. The method of claim 1 wherein the guard time occurs before a first data burst after the receiver is enabled.

* * * * *

UNITED STATES PATENT AND TRADEMARK OFFICE
CERTIFICATE OF CORRECTION

| | | |
|---|---|---|
| PATENT NO. | : 7,313,376 B1 | |
| APPLICATION NO. | : 10/987883 | |
| DATED | : December 25, 2007 | |
| INVENTOR(S) | : Alexander Wayne Hietala | |

It is certified that error appears in the above-identified patent and that said Letters Patent is hereby corrected as shown below:

Column 10, please replace claims 12-19 with the following claims:

-- 12. The method of claim 11 wherein detecting the DC offset of the digital signal comprises low-pass filtering the digital signal to detect the DC offset of the digital signal.

13. The method of claim 12 further comprising disabling the low-pass filtering of the digital signal at the end of the dead time and providing the DC offset of the digital signal as a constant value when the low-pass filtering of the digital signal is disabled.

14. The method of claim 13 wherein the low-pass filtering of the digital signal comprises time averaging the DC offset of the digital signal.

15. The method of claim 11 wherein the receiver operates according to the Global System for Mobile Communications (GSM) standard, and detecting the DC offset of the digital signal during the dead time comprises detecting the DC offset of the digital signal during at least a portion of a guard time defined by the GSM standard and corresponding to a period of time where the received RF signal contains guard bits, wherein the guard bits force a frequency of the downconverted signal to a fixed frequency offset from DC such that low-pass filtering the digital signal removes the fixed frequency.

16. The method of claim 16 further comprising disabling the low-pass filtering of the digital signal at a beginning of a first tail bit signifying an end of the guard time and a beginning of a received data burst.

17. The method of claim 16 wherein the guard time occurs between adjacent data bursts received by the receiver.

18. The method of claim 16 wherein the guard time occurs before a first data burst after the receiver is enabled.

UNITED STATES PATENT AND TRADEMARK OFFICE
CERTIFICATE OF CORRECTION

PATENT NO. : 7,313,376 B1
APPLICATION NO. : 10/987883
DATED : December 25, 2007
INVENTOR(S) : Alexander Wayne Hietala It is certified that error appears in the above-identified patent and that said Letters Patent is hereby corrected as shown below:

19. The method of claim 11 wherein the receiver is a direct conversion receiver and downconverting the amplified RF signal to the downconverted signal provides the downconverted signal at baseband. --

Signed and Sealed this

Third Day of June, 2008

JON W. DUDAS
*Director of the United States Patent and Trademark Office*

UNITED STATES PATENT AND TRADEMARK OFFICE
CERTIFICATE OF CORRECTION

PATENT NO. : 7,313,376 B1
APPLICATION NO. : 10/987883
DATED : December 25, 2007
INVENTOR(S) : Alexander Wayne Hietala It is certified that error appears in the above-identified patent and that said Letters Patent is hereby corrected as shown below:

Column 10, lines 3-35, please replace claims 12-19 with the following claims:

-- 12. The method of claim 11 wherein detecting the DC offset of the digital signal comprises low-pass filtering the digital signal to detect the DC offset of the digital signal.

13. The method of claim 12 further comprising disabling the low-pass filtering of the digital signal at the end of the dead time and providing the DC offset of the digital signal as a constant value when the low-pass filtering of the digital signal is disabled.

14. The method of claim 13 wherein the low-pass filtering of the digital signal comprises time averaging the DC offset of the digital signal.

15. The method of claim 11 wherein the receiver operates according to the Global System for Mobile Communications (GSM) standard, and detecting the DC offset of the digital signal during the dead time comprises detecting the DC offset of the digital signal during at least a portion of a guard time defined by the GSM standard and corresponding to a period of time where the received RF signal contains guard bits, wherein the guard bits force a frequency of the downconverted signal to a fixed frequency offset from DC such that low-pass filtering the digital signal removes the fixed frequency.

16. The method of claim 16 further comprising disabling the low-pass filtering of the digital signal at a beginning of a first tail bit signifying an end of the guard time and a beginning of a received data burst.

17. The method of claim 16 wherein the guard time occurs between adjacent data bursts received by the receiver.

18. The method of claim 16 wherein the guard time occurs before a first data burst after the receiver is enabled.

UNITED STATES PATENT AND TRADEMARK OFFICE
CERTIFICATE OF CORRECTION

| | | |
|---|---|---|
| PATENT NO. | : 7,313,376 B1 | |
| APPLICATION NO. | : 10/987883 | |
| DATED | : December 25, 2007 | |
| INVENTOR(S) | : Alexander Wayne Hietala | |

It is certified that error appears in the above-identified patent and that said Letters Patent is hereby corrected as shown below:

19. The method of claim 11 wherein the receiver is a direct conversion receiver and downconverting the amplified RF signal to the downconverted signal provides the downconverted signal at baseband. --

This certificate supersedes the Certificate of Correction issued June 3, 2008.

Signed and Sealed this

First Day of July, 2008

JON W. DUDAS
*Director of the United States Patent and Trademark Office*